United States Patent

Roeller

[15] 3,699,659
[45] Oct. 24, 1972

[54] MULTI-INDICATOR SETUP GAUGE
[72] Inventor: Erhart P. Roeller, 154 Scoles Avenue, Clifton, N.J. 07012
[22] Filed: Dec. 18, 1970
[21] Appl. No.: 99,592

[52] U.S. Cl..............33/172 R, 33/DIG. 1, 33/174 L, 248/124
[51] Int. Cl. ........A47g 29/00, G01b 3/22, G01b 5/20
[58] Field of Search......248/124, 287, 125, 122, 185, 248/184, 161, 206 A; 33/172 R, 172 B, 174 PA, 174 L, 174 E, 174 M, DIG. 1

[56] References Cited

UNITED STATES PATENTS

| | | |
|---|---|---|
| 70,547 | 11/1867 | Graham.............33/174 E UX |
| 1,341,935 | 6/1920 | Schustarich.............33/172 R |
| 1,778,481 | 10/1930 | Boucher...............33/172 R X |
| 1,989,691 | 2/1935 | Hirt.......................248/124 X |
| 2,476,239 | 7/1949 | Duncan....................248/122 |
| 2,763,932 | 9/1956 | McMillan..............33/DIG. 1 |
| 2,872,736 | 2/1959 | Abbott.....................33/172 R |

Primary Examiner—Ramon S. Britts
Attorney—James J. Cannon

[57] ABSTRACT

A multi-indicator setup gauge device is described for simultaneously taking two or more indications or measurements during setup or machining operations of a rotary workpiece is described, comprising a vertical support column having magnetic means at its lower end for selective attachment to a metal-working machine frame, and a post member telescopingly vertically adjustably received within the upper end of the support column and including means at its outer end for adjustably securing two or more dial gauge support arms adapted to have attached at their outer ends rotatably adjustable dial gauges or the like sensing devices. The inner ends of the dial gauge support arms are axially and rotatively adjustable with respect to their post member to provide for universal adjustable positioning of the dial gauges in a lateral plane.

1 Claim, 3 Drawing Figures

PATENTED OCT 24 1972 3,699,659

INVENTOR.
ERHART P. ROELLER
BY James J. Cannon
ATTORNEY.

MULTI-INDICATOR SETUP GAUGE

This invention relates to measuring devices and is directed particularly to a multi-indicator setup gauge for adjustably supporting a plurality of dial indicators and the like for simultaneously taking measurements in connection with setup and machining of a rotary workpiece in a lathe, milling machine, jig borer or the like.

It is the principal object of my invention to provide a multi-setup gauge indicator of the character described including two or more axially adjustable indicator attachment arms, each of which is rotatable through 360 circular degrees with respect to the other, and telescopingly adjustable support mechanism for the attachment arms permitting a wide range of adjustment in the height thereof. Means is also provided for removably and adjustably securing the support mechanism with respect to the framework of the metalworking machine with which the device is to be used. My multi-setup gauge indicator thus enables the measuring or indicating of two or more related cylindrical or rotating surfaces at the same time while setting up a wide variety of shapes and sizes of rotary workpieces, whether such surfaces to be indicated are interior or exterior cylindrical surfaces, for example, or a combination of such surfaces.

A more particular object of the invention is to provide a multi-setup gauge indicator of the character above-described comprising a cylindrical support column having magnetic means at its lower end for selective attachment to the steel framework of a metalworking machine, and telescopingly adjustably supporting at its upper or outer end a post member the outer end of which has adjustably secured thereto for rotary positioning throughout 360 circular degrees two or more elongated indicator arms adapted to support, at outer end portions thereof, dial indicator or measuring devices. The attachment means for the dial indicator devices permits 360 rotational degree radial positioning of the dial sensor plungers to provide the utmost flexibility in operation of the device.

Other objects, features and advantages of the invention will be apparent from the following description when read with reference to the accompanying drawings. In the drawings, wherein like reference numerals denote corresponding parts in each of the two views.

Figure 1:
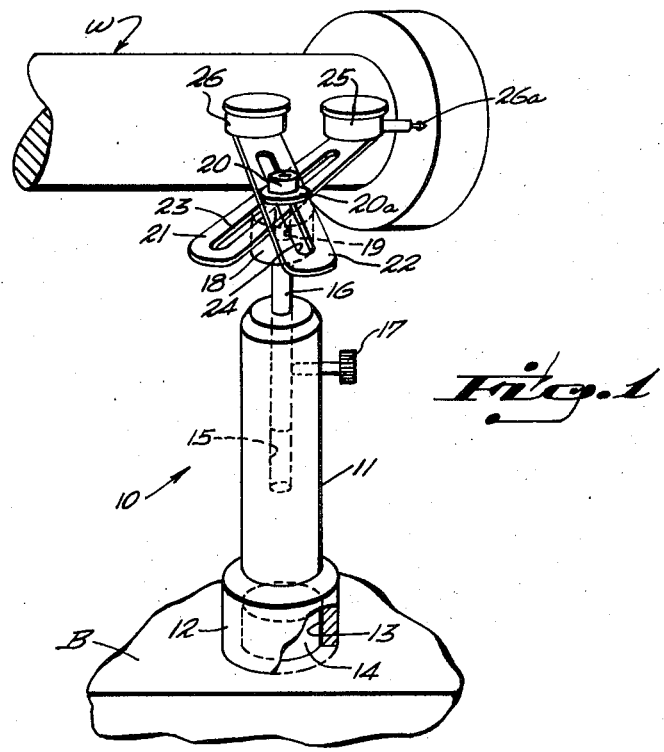
FIG. 1 is an oblique view, as seen from above and to the front, of a multi-indicator setup gauge embodying the invention, shown in use.
Figure 3:
FIG. 3 is a vertical cross-sectional view taken along the line 3—3 of FIG. 2 in the direction of the arrows.

Referring now to the drawing, reference numeral 10 in FIG. 1 designates a preferred form of multi-indicator setup gauge embodying the invention, the same being comprised of cylindrical support column 11, preferably of steel, integrally formed at its lower end with a cylindrical base of increased diameter designated by reference numeral 12. The base 12, in its underside, has a coaxial cylindrical recess 13 within which is securely affixed, in any convenient manner, a cylindrical magnet 14 the outer face of which is substantially flush with the lower end of said base. A comparatively small diameter axial bore 15 extends inwardly from the upper end of the cylindrical support column 11 to slidingly receive a cylindrical, elongated post member 16. A thumb screw 17 threaded in a radially extending tapped opening near the upper end of the cylindrical support column 11 is provided for securing the post member 16 in vertically adjusted position, for the purpose hereinafter more particularly described.

Integrally formed with, or otherwise securely affixed at the upper end of the cylindrical post member 16 in coaxial arrangement with respect thereto, is an increased diameter cylindrical head 18 in the upper face of which is an internally threaded coaxial bore 19 for the reception of a cap screw 20 adapted to secure in place one or more dial indicator arms 21, 22 (two illustrated in FIG. 1). The elongated dial indicator arms 21 and 22 are preferably formed of flat metal stock and are provided, centrally along their lengths, with elongated slots 23 and 24, respectively, for the through passage of the cap screw 20 in adjustably securing said indicator arms in place. A flat washer 20a fitted against the underside of the cap screw 20 serves as a clamping member against upper surface portions of the uppermost dial indicator arm 22 for the securement of said arms in and out and rotatively adjusted position with respect to the cylindrical head 18 of the cylindrical post member 16. Removably secured to outer end portions of each of the dial indicator arms 21 and 22 are dial indicators 25 and 26, respectively, said dial indicators preferably being secured by means of a thumb screw 28 extending through an opening 29 in said dial indicator arm. It will thus be seen that the dial indicators 25 and 26 can be secured at any rotative position at the outer ends of their respective dial indicator arms depending upon the particular measurements to be taken, as is hereinbelow more particularly described.

FIG. 1 illustrates, by way of example, use of my multi indicator setup gauge to indicate two rotating surfaces at the same time, such as might be required in setting up a workpiece W in a lathe chuck or a similar machine. As shown in FIG. 1, the cylindrical support column 11 of the device is affixed at a suitable position upon the lathe bed B, where it will be retained in place by the magnet 14, and the telescoping post member 16 will be elevated and secured at a proper height by means of the thumb screw 17 to position the dial indicators 25 and 26 at the proper level for taking readings with respect to the workpiece W being set up or machined. The horizontal in and out and rotative adjustability of the dial indicator arms 21 and 22 permits adjustable placement of their dial indicators 25 and 26 in wide range of mutually different positions for taking a wide variety of interior and exterior surface measurements of a rotative workpiece. The above-described rotative adjustability of the dial indicators 25, 26 permits ready positioning of their measuring sensor plungers 25a, 26a at the proper angle for taking measurements of internal surfaces.

Figure 2:
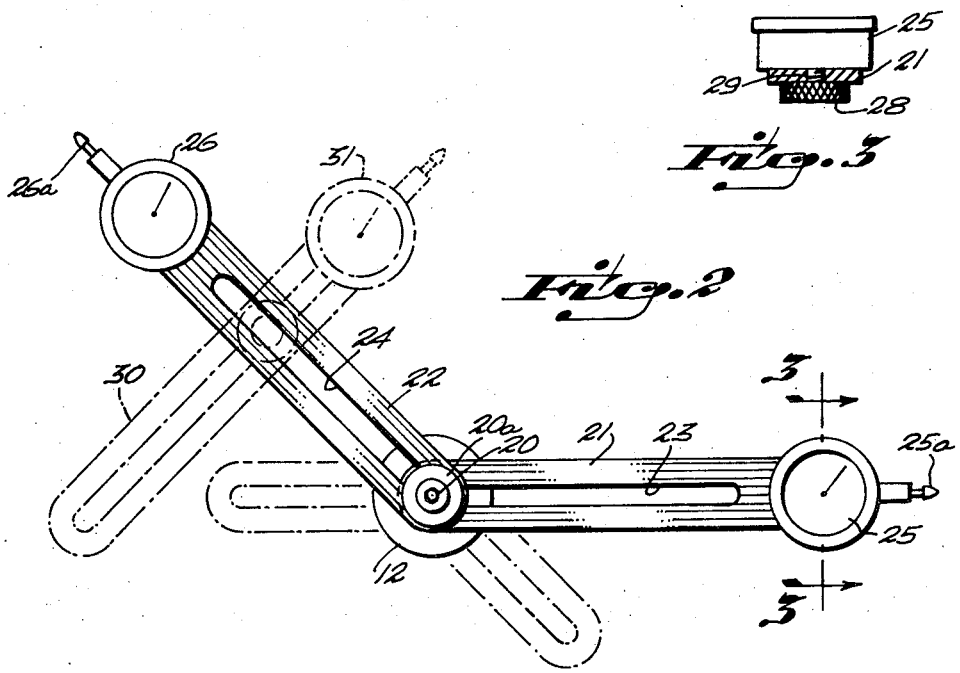
FIG. 2 is a top view of the multi-indicator setup gauge, shown separately.

FIG. 2 illustrates in broken line representation thereof, how a third dial indicator arm 30 and associated dial indicator 31 could be adjustably secured to one of the two indicator arms 21, 22 to simultaneously take a third reading of a multi-surface workpiece during set or during machining of such a workpiece. In this connection it will be understood that the primary use of my multi-indicator setup gauge is to measure concentricity in rotative workpieces during setup in a metal working machine such as a lathe, milling machine or jig borer, and to observe concentricity from time to time during machining of the workpiece.

While I have illustrated and described herein only one form in which my invention can conveniently be embodied in practice, it is to be understood that this form is given by way of example only and not in a limiting sense. The invention, in brief, comprises all the embodiments and modifications coming within the scope and spirit of the following claims.

What I claim as new and desire to secure by Letters Patent is:

1. A multi-indicator setup gauge comprising, in combination, an elongated support column member, having an upper cylindrical recess therein and a base portion having a lower cylindrical recess therein at the lower end of said support column member, magnetic means in said lower cylindrical recess for removably attaching said base portion to a metal-working machine, an elongated cylindrical post member telescopingly received in said upper recess, the upper end of said post member terminating in an enlarged concentric head portion having a threaded bore therein, radially directed screw means threadably received in said support column member and communicating with said upper recess, thereby securing said post member in vertical and rotatable adjustably extended relation with respect to the upper end of said support column member, a plurality of juxtaposed elongated dial indicator support arms each having an elongated slot therein adjustably secured to and supported by the enlarged head of said post member at right angles thereto, means adjustably securing said indicator support arms in rotatable and radial disposition with respect to the upper end of said post member, said indicator support arms securing means comprising a cap screw and washer, wherein said cap screw extends through said elongated slots and into the threaded bore in said enlarged head, said cap screw cooperating with said elongated slots thereby permitting radial and mutual rotative adjustment of said indicator support arms in a plane substantially normal to the longitudinal axis of said post member, each of said support arms being rotatable throughout substantially 360 circular degrees with respect to the other of said support arms, and thumb screw means rotatably and adjustably securing a plurality of dial indicators on said support arms, such that one indicator is adjustably located on a distal end portion of each of said dial indicator support arms, and measuring means carried by each of said indicators to permit the simultaneous taking of a plurality of measurements in connection with a setup and machining of a workpiece in a lathe or the like.

* * * * *